United States Patent
Oh et al.

(10) Patent No.: US 8,514,995 B1
(45) Date of Patent: Aug. 20, 2013

(54) TECHNIQUES FOR PHASE SHIFTING A PERIODIC SIGNAL BASED ON A DATA SIGNAL

(75) Inventors: Boon Hong Oh, Bukit Mertajam (MY); Peter Schepers, Bornem (BE); Da Hai Tang, Shanghai (CN)

(73) Assignee: Altera Corporation, San Jose, CA (US)

( * ) Notice: Subject to any disclaimer, the term of this patent is extended or adjusted under 35 U.S.C. 154(b) by 323 days.

(21) Appl. No.: 13/082,336

(22) Filed: Apr. 7, 2011

(51) Int. Cl.
*H04L 7/00* (2006.01)

(52) U.S. Cl.
USPC ........... 375/355; 375/360; 375/371; 375/373; 375/375; 327/152; 327/156; 327/291; 327/298

(58) Field of Classification Search
USPC ................. 375/215, 226, 294, 316, 326, 327, 375/355, 360, 371, 373, 374–376
See application file for complete search history.

(56) References Cited

U.S. PATENT DOCUMENTS

| | | | | |
|---|---|---|---|---|
| 6,236,696 | B1 * | 5/2001 | Aoki et al. | 375/376 |
| 7,555,085 | B1 * | 6/2009 | Risk et al. | 375/354 |
| 7,672,416 | B2 * | 3/2010 | Hadzic et al. | 375/360 |
| 7,817,767 | B2 * | 10/2010 | Tell et al. | 375/376 |
| 7,876,244 | B2 * | 1/2011 | Brunner et al. | 341/100 |
| 7,907,681 | B2 * | 3/2011 | Moriwaki | 375/316 |
| 8,189,729 | B2 * | 5/2012 | Hoang et al. | 375/373 |
| 8,238,508 | B2 * | 8/2012 | Pignol et al. | 375/376 |
| 8,369,472 | B2 * | 2/2013 | Umai et al. | 375/355 |
| 2002/0141515 | A1 * | 10/2002 | Enam et al. | 375/340 |
| 2011/0001531 | A1 * | 1/2011 | Nishi et al. | 327/162 |
| 2011/0075781 | A1 * | 3/2011 | Kenney | 375/376 |
| 2011/0197086 | A1 * | 8/2011 | Rivoir | 713/500 |
| 2011/0273215 | A1 * | 11/2011 | Gupta | 327/298 |
| 2012/0063556 | A1 * | 3/2012 | Hoang | 375/371 |
| 2012/0200325 | A1 * | 8/2012 | Werner | 327/156 |

OTHER PUBLICATIONS

Altera Corporation, "Serial Digital Interface Reference Design for Stratix IV Devices," AN-600-1.2, Dec. 2010, p. 1-13.
Altera Corporation, "An 454: Implementing PLL Reconfiguration in Stratix III and Stratix IV Devices," Dec. 2009, pp. 1-20.
John Snow, "Implementing Triple-Rate SDI with Virtex-6 FPGA GTX Transceivers," XAPP1075 (v1.1) Nov. 2, 2010, pp. 1-56.
Peter Schepers, "Clock Recovery Generation Demo Design for OC-3 rate operation," Feb. 19, 2010, pp. 1-20.
Peter Schepers, "High Speed Demo Designs," Feb. 19, 2010, pp. 1-14.

* cited by examiner

*Primary Examiner* — Hirdepal Singh
(74) *Attorney, Agent, or Firm* — Steven J. Cahill

(57) ABSTRACT

A circuit includes a receiver circuit, a data valid monitor circuit, a clock signal generation circuit, and a phase shift circuit. The receiver circuit is operable to generate a first periodic signal, a sampled data signal based on an input data signal, and a data valid signal based on a predefined number of bits in the sampled data signal. The data valid monitor circuit is operable to generate a count value by counting periods of the first periodic signal. The data valid monitor circuit is operable to generate a phase error signal based on the data valid signal and the count value. The clock signal generation circuit is operable to generate a second periodic signal. The phase shift circuit is operable to generate a third periodic signal based on the second periodic signal and to adjust a phase of the third periodic signal based on the phase error signal.

21 Claims, 8 Drawing Sheets

TECHNIQUES FOR PHASE SHIFTING A PERIODIC SIGNAL BASED ON A DATA SIGNAL

FIELD OF THE INVENTION

The present invention relates to electronic circuits, and more particularly, to techniques for phase shifting a periodic signal based on a data signal.

BACKGROUND

A high-speed serial data signal can be transmitted through transmission lines from a transmitter to a receiver without an accompanying clock signal. A clock data recovery (CDR) circuit in the receiver generates clock signals from an approximate frequency reference signal, and then phase-aligns the clock signals with respect to the data signal. The receiver uses the clock signals to sample data bits in the data signal.

The Stratix® IV GX field programmable gate array (FPGA) manufactured by Altera Corporation of San Jose, Calif., includes a CDR circuit that functions in lock-to-data mode and lock-to-reference mode. In lock-to-data mode, the CDR circuit adjusts the phases of its output clock signals based on the phase of the input data signal. In lock-to-reference mode, the CDR circuit adjusts the phases and frequencies of its output clock signals based on the phase and the frequency of a reference clock signal using a phase-locked loop (PLL) circuit.

The Stratix® IV GX field programmable gate array (FPGA) circuit uses an external voltage-controlled crystal oscillator (VCXO) circuit to generate a recovered clock signal. The Stratix® IV GX FPGA circuit includes a receiver circuit, a transmitter circuit, a first-in-first-out (FIFO) buffer circuit, a phase and frequency detector (PFD) circuit, and a phase-locked loop (PLL) circuit.

An input data signal (Data In) is provided to an input of the receiver circuit, as serial data bits. The data rate of the Data In signal may be 270 megabits per second (Mbps), for instance. The Data In signal is transmitted according to a standard for video interfaces referred to as Standard-Definition Serial Digital Interface (SD-SDI). The receiver circuit and the transmitter circuit function according to the standard for SD-SDI. The receiver circuit samples data bits in the Data In signal to generate sampled data bits. The receiver circuit de-serializes the sampled data bits to generate parallel data bits in parallel data signals. The receiver circuit asserts a logic high pulse in a data valid signal for each 10-bit data word that is sampled in the Data In signal. The data valid signal is a periodic signal having a frequency of approximately 27 megahertz (MHz), in this instance.

The receiver circuit contains a CDR circuit that generates a recovered clock signal. The Stratix® IV GX does not support input data signals having data rates of less than 600 megabits per second (Mbps). In order to support data rates less than 600 Mbps, the receiver circuit oversamples the Data In signal 11 times, and the CDR circuit remains in lock-to-reference mode. Because the CDR circuit does not operate in lock-to-data mode, the recovered clock signal is not phase adjusted based on the phases of data bits in the Data In signal.

The external VCXO circuit generates a low jitter clock signal having a frequency of 148.5 MHz. The low jitter clock signal is provided to inputs of the receiver circuit, the transmitter circuit, and the PLL circuit. The CDR circuit in receiver circuit generates the recovered clock signal in response to the low jitter clock signal generated by the VCXO circuit.

The PLL circuit generates a clock signal having a frequency of 27 MHz in response to the low jitter clock signal generated by the VCXO circuit. The clock signal generated by the PLL is provided to inputs of the transmitter circuit, the FIFO buffer circuit, and the PFD circuit. The PFD circuit compares the phase and frequency of the clock signal generated by the PLL circuit to the phase and frequency of the data valid signal generated by the receiver circuit to generate a control voltage signal. The PFD circuit generates the control voltage based on the differences between the phase and frequency of the data valid signal and the phase and frequency of the clock signal generated by the PLL circuit. The VCXO circuit varies the phase and frequency of the low jitter clock signal based on changes in the control voltage signal. The PFD circuit causes the VCXO circuit to adjust the phase and frequency of the low jitter clock signal to cause the phase and frequency of the clock signal generated by the PLL circuit to match the phase and frequency of the data valid signal.

The FIFO buffer circuit stores the parallel data signals from the receiver circuit as stored data bits in response to the recovered clock signal and the data valid signal. The FIFO buffer circuit outputs the stored data bits, in parallel to the transmitter, in response to the clock signal generated by the PLL. The transmitter circuit serializes the received data bits to generate serial data bits and transmits the serial data bits in response to the clock signal generated by the PLL and the low jitter clock signal generated by the VCXO circuit.

If the Data In signal has a data rate of exactly 270 Mbps, and the recovered clock signal has a frequency of exactly 148.5 MHz, the data valid signal has an average frequency of 27 MHz, and the data valid signal has a fixed pattern of pulses that is repeated as long as the data rate of the Data In signal remains at exactly 270 Mbps. According to this repeating fixed pattern of pulses, the data valid signal is in a logic high state for 1 cycle of the recovered clock signal, then in a logic low state for 4 cycles of the recovered clock signal, then in a logic high state for 1 cycle of the recovered clock signal, and then in a logic low state for 5 cycles of the recovered clock signal (i.e., 1H, 4L, 1H, 5L, . . . ).

The serial data rate of the Data In signal is not always exactly 270 Mbps. If the Data In signal has a data rate that is not exactly 270 Mbps, and the recovered clock signal has a frequency of exactly 148.5 MHz, the pattern of pulses in the data valid signal varies. For example, if the Data In signal has a data rate of slightly less than 270 Mbps, the data valid signal has the following pattern of pulses, 1H, 4L, 1H, 5L, 1H, 5L, 1H, 4L, 1H, 5L . . . . If the data rate of the Data In signal is slightly greater than 270 Mbps, the data valid signal has the following pattern of pulses, 1H, 4L, 1H, 5L, 1H, 4L, 1H, 4L, 1H, 5L . . . .

Thus, the data valid signal has large phase variations when the data rate of the Data In signal is not exactly 270 Mbps. Therefore, the data valid signal cannot be used by a PLL to generate a system clock signal or a clock signal that is provided to external components. Also, external VCXO circuits are costly and require extra board space.

BRIEF SUMMARY

According to some embodiments of the present invention, a circuit includes a receiver circuit, a data valid monitor circuit, a clock signal generation circuit, and a phase shift circuit. The receiver circuit is operable to generate a first periodic signal, a sampled data signal based on an input data signal, and a data valid signal based on a predefined number of bits in the sampled data signal. The data valid monitor circuit is operable to generate a count value by counting periods of the first periodic signal. The data valid monitor circuit is operable to generate a phase error signal based on the data valid signal and the count value. The clock signal generation circuit is operable to generate a second periodic signal. The phase shift circuit is operable to generate a third periodic signal based on the second periodic signal and to adjust a phase of third periodic signal based on the phase error signal.

According to some embodiments of the present invention, the circuit including the receiver circuit, the data valid monitor circuit, the clock signal generation circuit, and the phase shift circuit differs from the conventional circuit in that the conventional circuit does not have at least a data valid monitor circuit operable to generate a count value by counting periods of a first periodic signal and to generate a phase error signal based on the data valid signal and the count value.

Various objects, features, and advantages of the present invention will become apparent upon consideration of the following detailed description and the accompanying drawings.

DETAILED DESCRIPTION

Figure 1:
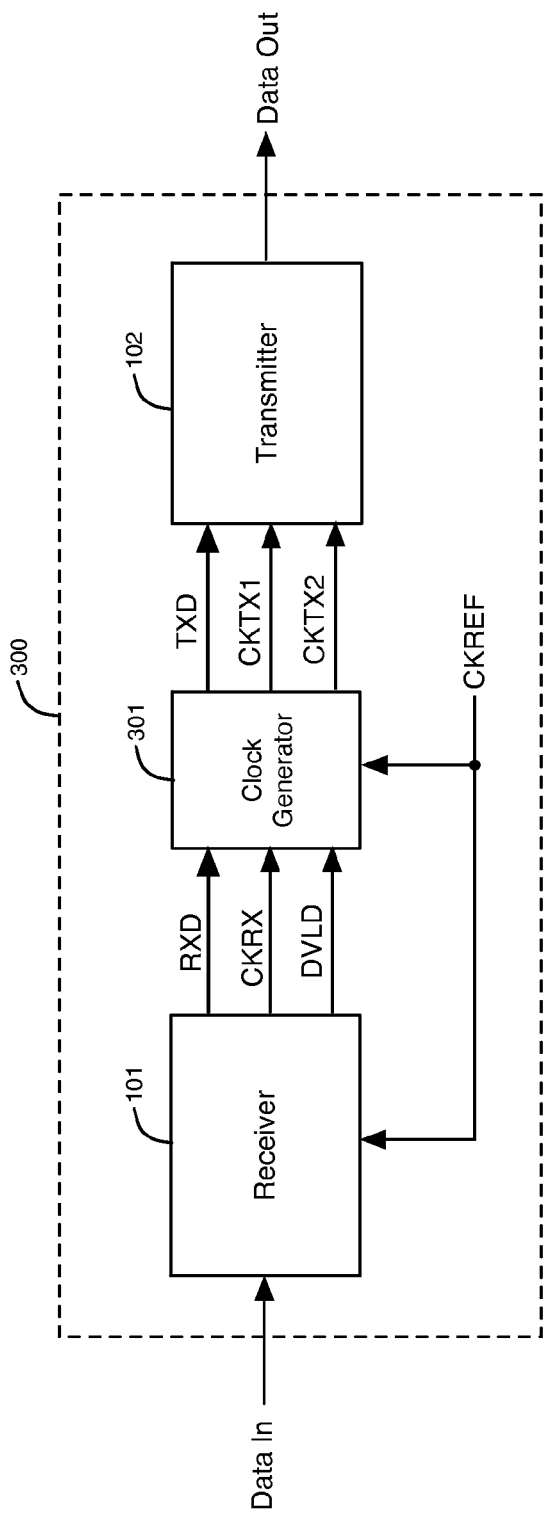
FIG. 1 illustrates an example of a transceiver circuit, according to an embodiment of the present invention.

FIG. 1 illustrates an example of a transceiver circuit 300, according to an embodiment of the present invention. Transceiver circuit 300 may be in an integrated circuit such as a field programmable gate array integrated circuit. Transceiver circuit 300 includes receiver circuit 101, transmitter circuit 102, and clock generator circuit 301. Transceiver circuit 300 does not require an external oscillator circuit, and therefore, transceiver circuit 300 is less costly and uses less board space than the system described above that uses an external VCXO circuit. Receiver circuit 101 and transmitter circuit 102 function according to the interface standard for SD-SDI, in one embodiment.

Receiver circuit 101 receives an input data signal Data In. Receiver circuit 101 samples data bits in the Data In signal to generate parallel data signals RXD. Receiver circuit 101 asserts a logic high pulse in a data valid signal DVLD in response to a given number of bits in a data word, e.g., 8 bits, 9 bits, 10 bits, 11 bits, 12 bits, etc., that has been sampled in the Data In signal. As such, using 10 bits in embodiments described herein is exemplary and not intended to limit the scope of the present invention. Receiver circuit 101 contains a clock data recovery (CDR) circuit that generates a recovered clock signal CKRX in response to a reference clock signal CKREF. Clock signal CKREF may be provided from an external source or generated on-chip (e.g., by a PLL). Recovered clock signal CKRX is not phase adjusted based on data bits in the Data In signal, because the CDR circuit in receiver circuit 101 remains in lock-to-reference mode and does not transition to lock-to-data mode. The clock signals described herein are repeating periodic signals.

Figure 2:
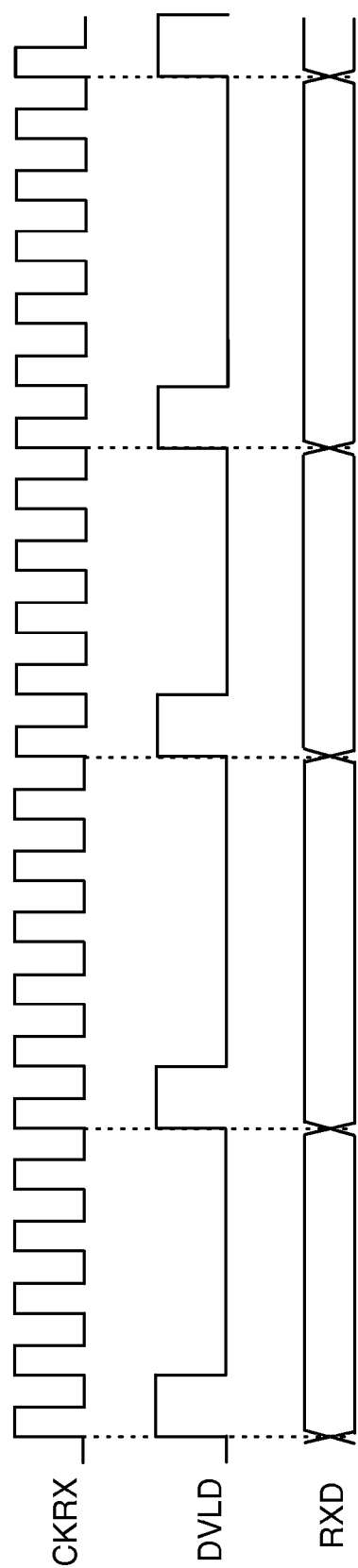
FIG. 2 illustrates exemplary waveforms signals CKRX, DVLD, and RXD when the Data In signal has a data rate of 270 Mbps in accordance with one embodiment.

FIG. 2 illustrates exemplary waveforms for the recovered clock signal (CKRX), the data valid signal (DVLD), and the parallel data signals (RXD) generated by receiver circuit 101 when the Data In signal has a data rate of exactly 270 Mbps. A data rate of 270 Mbps is exemplary and not intended to limit the scope of the present invention.

The data signals RXD, clock signal CKRX, and data valid signal DVLD are provided to inputs of clock generator circuit 301. Clock generator circuit 301 generates parallel data signals TXD that contain the same data bits in parallel data signals RXD. Clock generator circuit 301 generates clock signals CKTX1 and CKTX2 in response to clock signals CKREF and CKRX and signal DVLD. Signals TXD, CKTX1, and CKTX2 are provided to inputs of transmitter circuit 102. Transmitter circuit 102 generates a serial data output signal Data Out that contains the data bits in parallel data signals TXD in response to clock signals CKTX1 and CKTX2. The serializer circuit in transmitter circuit 102 serializes the data bits in parallel data signals TXD to generate serial data bits in signal Data Out in response to clock signal CKTX1. Clock signal CKTX2 is used as a transmit reference clock signal for a phase-locked loop (PLL) circuit in transmitter circuit 102.

Figure 3:
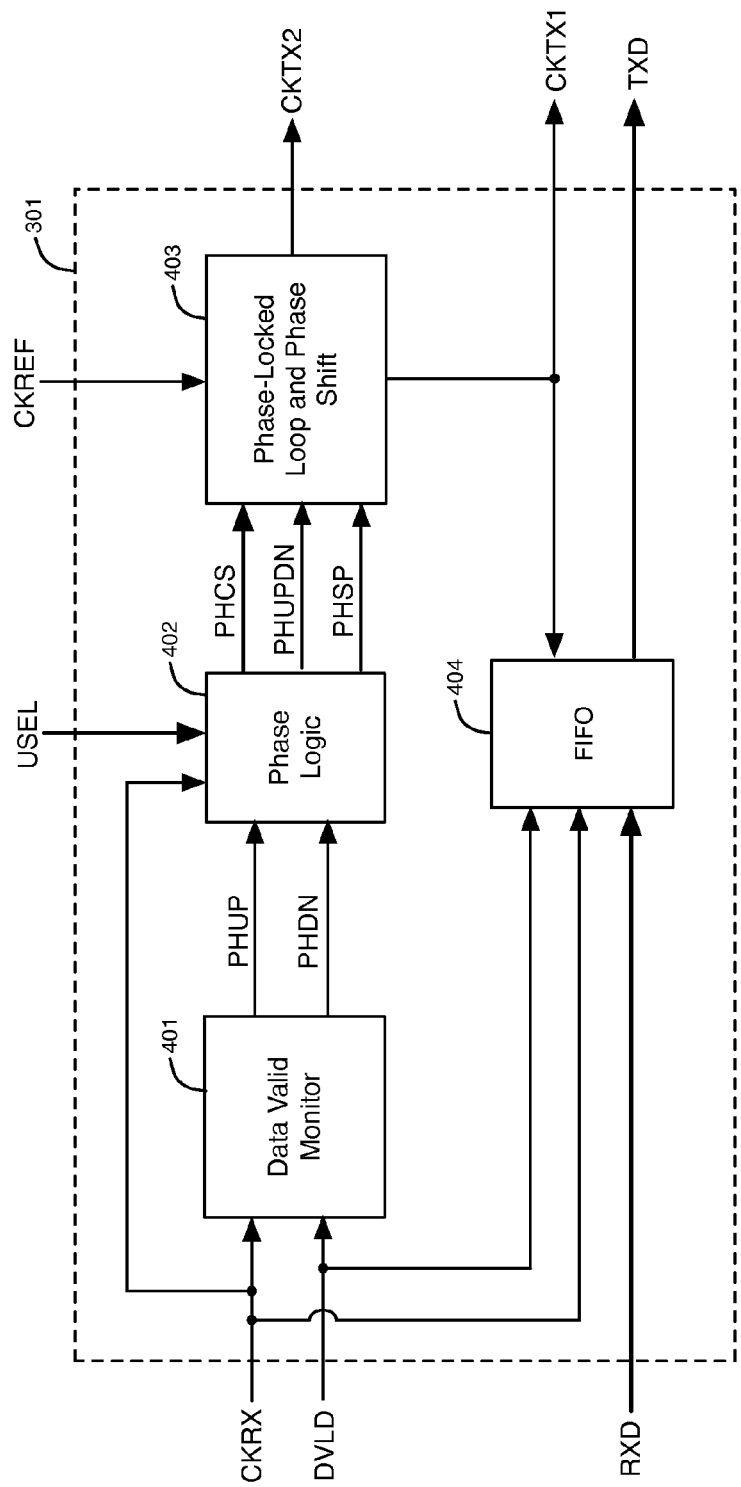
FIG. 3 illustrates an example of the clock generator circuit of FIG. 1, according to an embodiment of the present invention.

FIG. 3 illustrates an example of clock generator circuit 301, according to an embodiment of the present invention. Clock generator circuit 301 includes data valid monitor circuit 401, phase logic circuit 402, phase-locked loop (PLL) and phase shift circuit 403, and first-in-first-out (FIFO) buffer circuit 404. The clock generator circuit 301 of FIG. 3 differs from the conventional circuit in that the conventional circuit does not have at least a data monitor circuit 401, a phase logic circuit 402, and a PLL and phase shift circuit 403, as shown and described herein.

Clock signal CKRX and data valid signal DVLD generated by receiver circuit 101 are provided to inputs of data valid monitor circuit 401. Data valid monitor circuit 401 generates two phase error signals PHUP and PHDN based on clock signal CKRX and data valid signal DVLD. The phase error signals PHUP and PHDN are provided to inputs of phase logic circuit 402.

Phase logic circuit 402 generates a phase up/down signal PHUPDN and a phase step signal PHSP based on phase error signals PHUP and PHDN. User clock select signals USEL are also provided to inputs of phase logic circuit 402. Phase logic circuit 402 generates phase counter select signals PHCS based on user select signals USEL.

The reference clock signal CKREF, signals PHCS, signal PHUPDN, and signal PHSP are provided to inputs of phase-locked loop (PLL) and phase shift circuit 403. PLL and phase shift circuit 403 generate output clock signals CKTX1 and CKTX2 in response to reference clock signal CKREF. PLL and phase shift circuit 403 shifts the phases of clock signals CKTX1 and CKTX2 based on the PHUPDN, PHCS, and PHSP signals.

Signals RXD, CKRX, and DVLD are provided to inputs of FIFO buffer circuit 404. FIFO buffer circuit 404 stores the data bits received in parallel data signals RXD in response to clock signal CKRX and data valid signal DVLD. FIFO buffer circuit 404 outputs the stored data bits received from signals RXD as parallel data signals TXD in response to clock signal CKTX1.

Figure 4:
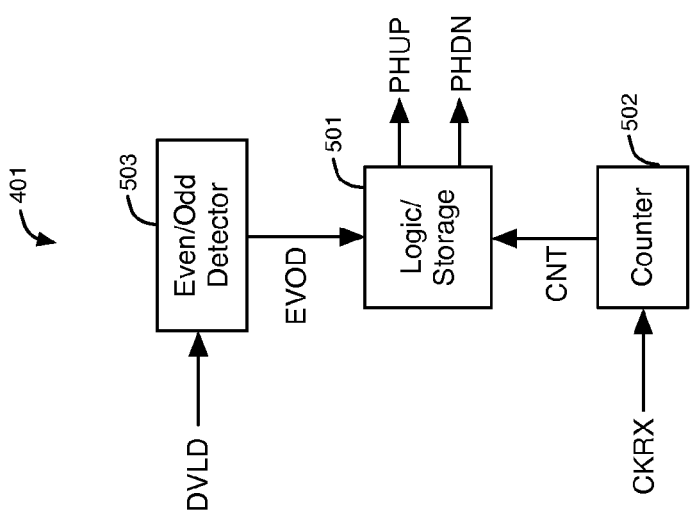
FIG. 4 illustrates an example of the data valid monitor circuit of FIG. 3, according to an embodiment of the present invention.

FIG. 4 illustrates an example of data valid monitor circuit 401, according to an embodiment of the present invention. Data valid monitor circuit 401 includes logic and storage circuit 501, a counter circuit 502, and an even/odd detector circuit 503.

Clock signal CKRX is provided to an input of counter circuit 502. Counter circuit 502 generates count signals CNT based on clock signal CKRX. The digital value of count signals CNT equals a count value that is generated by counter circuit 502. Counter circuit 502 increases the count value of the count signals CNT by 1 in response to each rising edge detected in clock signal CKRX. Counter circuit 502 increases the count value of the count signals CNT from 1 to 11 in response to receiving 11 consecutive rising edges in clock signal CKRX. After the count value of the count signals CNT reaches 11, counter circuit 502 resets the count value of the count signals CNT to 1. According to an alternative embodiment, counter circuit 502 increases the count signals CNT from a count value of 0 to a count value of 10 in response to receiving 11 consecutive rising edges in clock signal CKRX, and then resets the count value of count signals CNT to 0.

The data valid signal DVLD is provided to an input of even/odd detector circuit 503. Even/odd detector circuit 503 generates an even/odd detection signal EVOD in response to data valid signal DVLD. Even/odd detector circuit 503 generates a first logic state (e.g., a logic high state) in the EVOD signal in response to each of the odd numbered rising edges in the data valid signal DVLD (i.e., the first rising edge, the third rising edge, the fifth rising edge, the seventh rising edge, etc.). Even/odd detector circuit 503 generates a second logic state (e.g., a logic low state) in the EVOD signal in response to each of the even numbered rising edges in the data valid signal DVLD (i.e., the second rising edge, the fourth rising edge, the sixth rising edge, the eighth rising edge, etc.).

Logic and storage circuit 501 includes logic circuits and storage circuits. In one embodiment, logic and storage circuit 501 stores the count value of the count signals CNT in the storage circuits as a data valid position value each time that the EVOD signal changes from the first logic state to the second logic state. Even/odd detector circuit 503 causes signal EVOD to change from the first logic state to the second logic state in response to receiving an even numbered rising edge in the data valid signal DVLD.

In an alternative embodiment, logic and storage circuit 501 stores the count value of the count signals CNT in the storage circuits as a data valid position value each time that the EVOD signal changes from the second logic state to the first logic state. Even/odd detector circuit 503 causes signal EVOD to change from the second logic state to the first logic state in response to receiving an odd numbered rising edge in the data valid signal DVLD. Thus, logic and storage circuit 501 stores the current count value of the count signals CNT in the storage circuits as the data valid position value in response to every other rising edge in signal DVLD.

Logic and storage circuit 501 generates the PHUP and PHDN signals. Signals PHUP and PHDN are initially in logic low states. Logic and storage circuit 501 causes the PHUP and PHDN signals to remain in logic low states while the data valid position value stored in logic and storage circuit 501 remains constant. The data valid position value stored in logic and storage circuit 501 increases by one when the data rate of the input data signal Data In is less than 270 Mbps. If the data valid position value stored in logic and storage circuit 501 increases by one, logic and storage circuit 501 generates a logic high pulse in the PHUP signal, and logic and storage circuit 501 causes the PHDN signal to remain in a logic low state. The data valid position value stored in logic and storage circuit 501 decreases by one when the data rate of the input data signal Data In is greater than 270 Mbps. If the data valid position value stored in logic and storage circuit 501 decreases by one, logic and storage circuit 501 generates a logic high pulse in the PHDN signal, and logic and storage circuit 501 causes the PHUP signal to remain in a logic low state.

Referring to FIG. 3, phase logic circuit 402 generates a logic high state in the PHUPDN signal in response to a logic high pulse the PHUP signal. Phase logic circuit 402 generates a logic low state in the PHUPDN signal in response to a logic high pulse in the PHDN signal. Phase logic circuit 402 generates a series of consecutive repeating logic high pulses in the PHSP signal in response to a logic high pulse in either one of the PHUP or PHDN signals. Phase logic circuit 402 generates a digital value in signals PHCS that is based on the digital value of the user select signals USEL.

Figure 5:
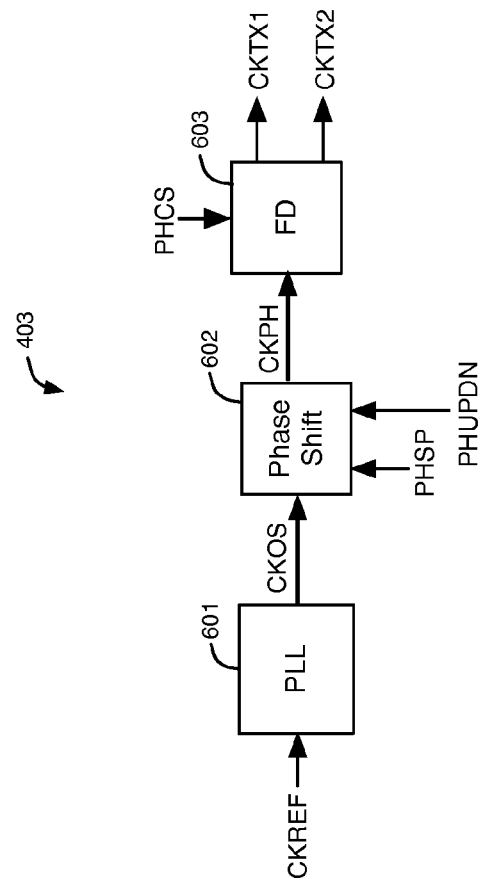
FIG. 5 illustrates an example of the phase-locked loop (PLL) and phase shift circuit of FIG. 3, according to an embodiment of the present invention.

FIG. 5 illustrates an example of phase-locked loop (PLL) and phase shift circuit 403, according to an embodiment of the present invention. PLL and phase shift circuit 403 includes a phase-locked loop (PLL) circuit 601, phase shift circuit 602, and frequency divider (FD) circuits 603.

PLL circuit 601 generates multiple periodic output clock signals CKOS (e.g., 8 clock signals) in response to reference clock signal CKREF. Clock signals CKOS are generated at the outputs of an oscillator circuit in PLL circuit 601. Clock signals CKOS are provided to inputs of phase shift circuit 602.

Phase shift circuit 602 shifts the phases of clock signals CKOS to generate phase shifted clock signals CKPH. Phase shifted clock signals CKPH have the same frequencies as clock signals CKOS. Phase shift circuit 602 adjusts the phase shifts provided to clock signals CKPH relative to the phases of clock signals CKOS based on changes in signals PHUPDN and PHSP.

Phase shift circuit 602 shifts the phase of each of clock signals CKPH by one phase step in response to each logic high pulse received in phase step signal PHSP.

Signal PHUPDN determines the direction of the phase shift adjustments that phase shift circuit 602 provides to the phases of clock signals CKPH relative to the phases of clock signals CKOS. If the PHUPDN signal is in a logic high state, phase shift circuit 602 causes the phases (i.e., rising and falling edges) of clock signals CKPH to occur later in time by one phase step in response to each logic high pulse in signal PHSP. If the PHUPDN signal is in a logic low state, phase shift circuit 602 causes the phases of clock signals CKPH to occur earlier in time by one phase step in response to each logic high pulse in signal PHSP.

In an embodiment, an oscillator circuit in PLL circuit 601 generates different phase offsets between clock signals CKOS. For example, the oscillator circuit in PLL circuit 601 may generate 8 clock signals CKOS having relative phase offsets of 0°, 45°, 90°, 135°, 180°, 225°, 270°, and 315°. In this embodiment, phase shift circuit 602 includes multiplexer circuits that determine which of the clock signals CKOS are used to generate clock signals CKPH. The multiplexer circuits select different clock signals CKOS having different phases to generate phase shifts in clock signals CKPH in response to changes in signals PHUPDN and PHSP.

Frequency divider circuits 603 generate frequency divided clock signals based on phase shifted clock signals CKPH. Frequency divider circuits 603 divide the frequencies of clock signals CKPH to generate the frequencies of the frequency divided clock signals. Circuits 603 include multiplexers. The multiplexers in circuits 603 select two of the frequency divided clock signals as clock signals CKTX1 and CKTX2 based on the digital value of signals PHCS. Frequency divider circuits 603 generate output clock signals CKTX1 and CKTX2 based on two of the phase shifted clock signals CKPH. A user can select the digital value of the user select signals USEL to determine which of the clock signals CKPH are used to generate clock signals CKTX1 and CKTX2.

Figure 6:
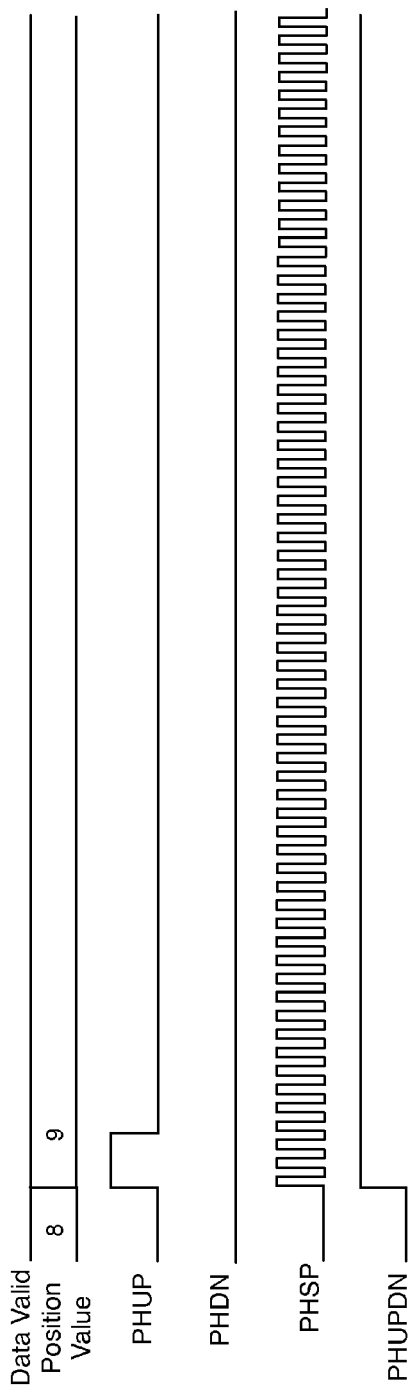
FIGS. 6-7 are timing diagrams that illustrate examples of waveforms for signals PHUP, PHDN, PHSP, and PHUPDN, according to embodiments of the present invention.
Figure 7:
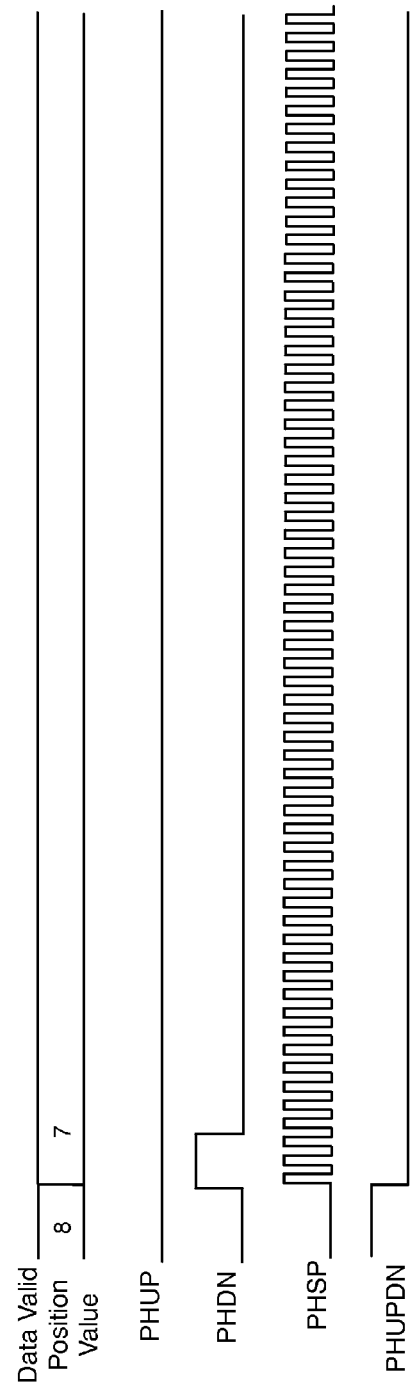

FIGS. 6-7 are timing diagrams that illustrate examples of waveforms for signals PHUP, PHDN, PHSP, and PHUPDN, according to embodiments of the present invention. FIGS. 6-7 also illustrates examples of the data valid position value.

In the examples of FIGS. 6-7, the data valid position value is initially 8, indicating that the count value of the count signals CNT generated by counter circuit 502 is 8 at an even numbered rising edge in the data valid signal DVLD, or alternatively, at an odd numbered rising edge in the data valid signal DVLD.

In FIG. 6, the data valid position value changes from 8 to 9. In response to the data valid position value increasing from 8 to 9, logic and storage circuit 501 generates a logic high pulse in the PHUP signal and maintains the PHDN signal in a logic low state, as shown in FIG. 6. In response to receiving the logic high pulse in the PHUP signal, phase logic circuit 402 generates a series of 64 consecutive logic high pulses in the PHSP signal, and phase logic circuit 402 causes the PHUPDN signal to transition from a logic low state to a logic high state, as shown in FIG. 6. 64 consecutive logic high pulses in the PHSP signal is an exemplary value that is not intended to limit the scope of the present invention.

PLL and phase shift circuit 403 shifts the phase of each of the CKTX1 and CKTX2 clock signals by one phase step in response to each of the 64 logic high pulses in the PHSP signal. When the PHUPDN signal is in a logic high state, PLL and phase shift circuit 403 causes the phase of each of the CKTX1 and CKTX2 clock signals to occur later in time by 64 phase steps in response to the 64 logic high pulses in signal PHSP that are shown in FIG. 6.

In FIG. 7, the data valid position value changes from 8 to 7. In response to the data valid position value decreasing from 8 to 7, logic and storage circuit 501 generates a logic high pulse in the PHDN signal and maintains the PHUP signal in a logic low state, as shown in FIG. 7. In response to receiving the logic high pulse in the PHDN signal, phase logic circuit 402 generates a series of 64 consecutive logic high pulses in the PHSP signal, and phase logic circuit 402 causes the PHUPDN signal to transition from a logic high state to a logic low state, as shown in FIG. 7. When the PHUPDN signal is in a logic low state, PLL and phase shift circuit 403 causes the phase of each of the CKTX1 and CKTX2 clock signals to occur earlier in time by 64 phase steps in response to the 64 logic high pulses in signal PHSP.

According to a specific example of transceiver circuit 300 that is not intended to be limiting, each of clock signals CKRX and CKREF has a frequency of 148.5 MHz, each of clock signals CKOS has a frequency of 1188 MHz, clock signal CKTX1 has a frequency of 27 MHz, and clock signal CKTX2 has a frequency of 148.5 MHz. In this example, the minimum phase shift that phase shift circuit 602 can provide to each of clock signals CKPH equals $\frac{1}{8}^{th}$ of the period of each of clock signals CKOS. Therefore, PLL and phase shift circuit 403 shifts the phase of each of clock signals CKTX1 and CKTX2 by 105.22 picoseconds in response to each logic high pulse in signal PHSP, and PLL and phase shift circuit 403 generates a total phase shift of 6.734 nanoseconds in each of clock signals CKTX1 and CKTX2 in response to the 64 logic high pulses in the PHSP signal shown in FIGS. 6-7.

The phase shifts that clock generator circuit 301 provides to clock signals CKTX1 and CKTX2 in response to each logic high pulse in signals PHUP and PHDN are separated into 64 discrete phase adjustments in the embodiments of FIGS. 6-7. Separating the phase shifts in the CKTX1 and CKTX2 clock signals into multiple separate phase adjustments (e.g., 64 phase adjustments) in each clock signal reduces jitter in the CKTX1 and CKTX2 clock signals and reduces jitter in the Data Out signal, compared to shifting the phase of each of the CKTX1 and CKTX2 clock signals by a single large phase adjustment.

Figure 8:
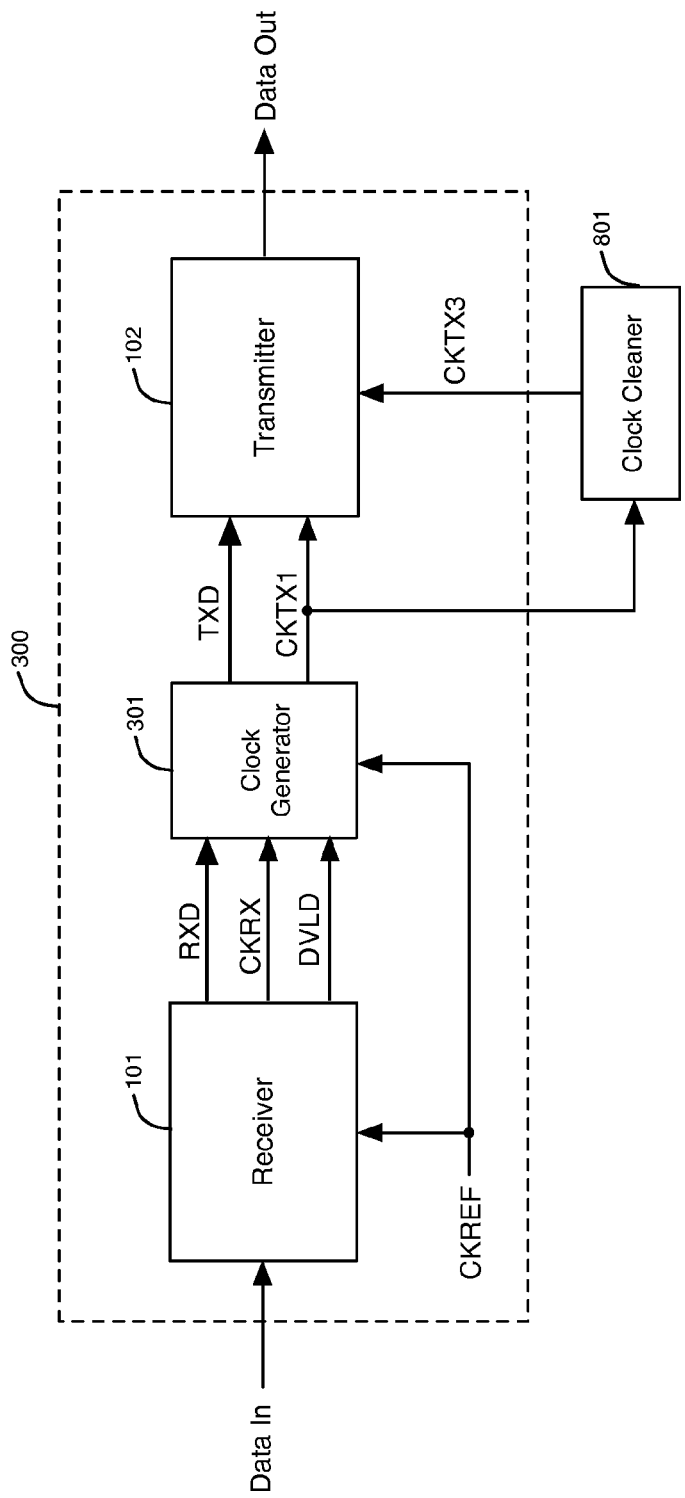
FIG. 8 illustrates an alternative application of the transceiver circuit of FIG. 1, according to an embodiment of the present invention.

FIG. 8 illustrates an alternative application of transceiver circuit 300, according to an embodiment of the present invention. In the embodiment of FIG. 8, the output clock signal CKTX1 of clock generator circuit 301 is also provided to an external clock cleaner circuit 801 that is located outside the integrated circuit containing transceiver circuit 300.

Clock cleaner circuit 801 generates a low jitter output clock signal CKTX3 in response to clock signal CKTX1. Clock signal CKTX3 is provided to an input of transmitter circuit 102. Clock signal CKTX3 may, for example, be used as a reference clock signal for a PLL in transmitter circuit 102. Clock cleaner circuit 801 may, for example, be a PLL circuit.

Figure 9:
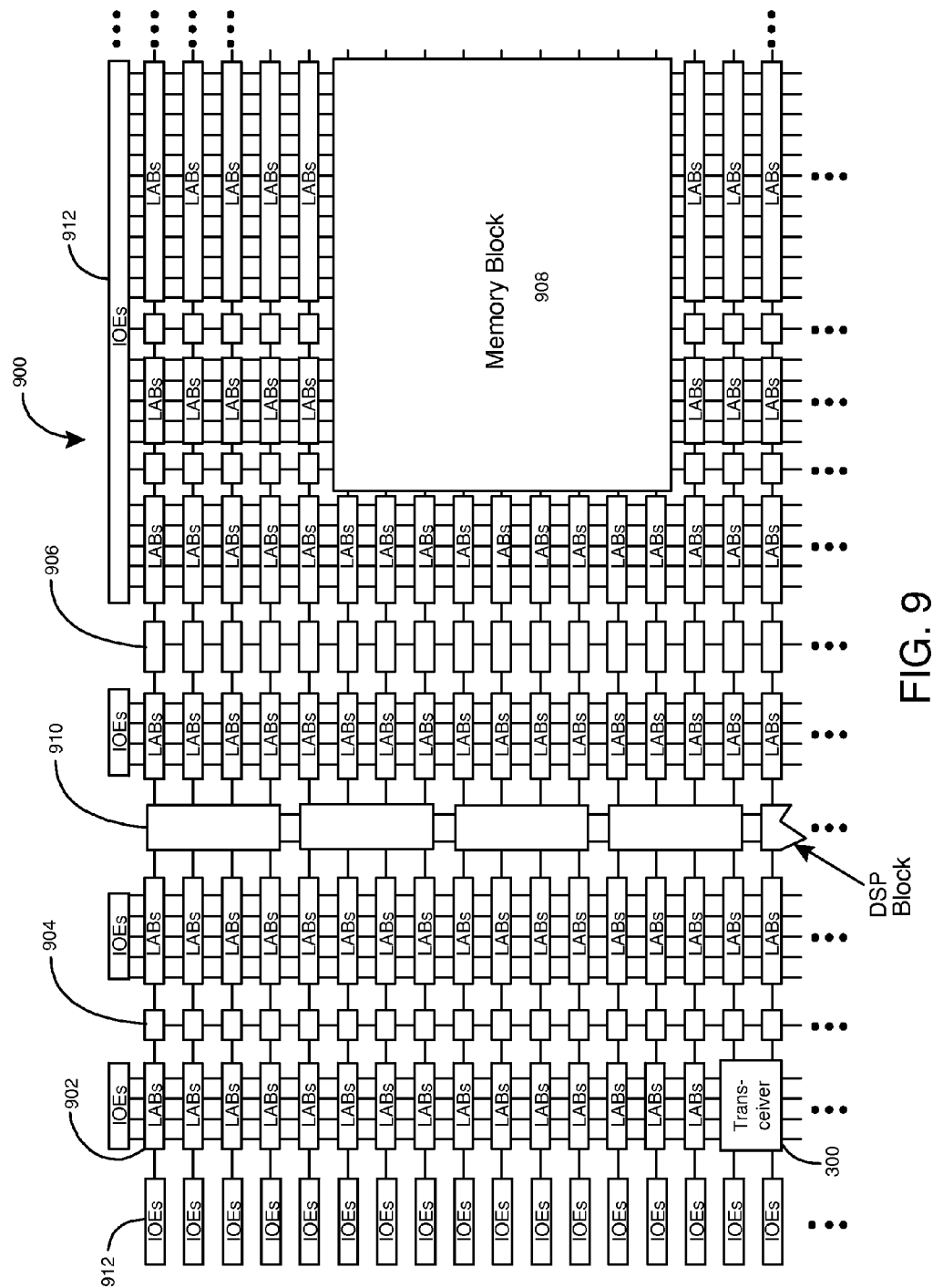
FIG. 9 is a simplified partial block diagram of a field programmable gate array (FPGA) that can include aspects of the present invention.

FIG. 9 is a simplified partial block diagram of a field programmable gate array (FPGA) 900 that can include aspects of the present invention. FPGA 900 is merely one example of an integrated circuit that can include features of the present invention. It should be understood that embodiments of the present invention can be made in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

FPGA 900 includes a two-dimensional array of programmable logic array blocks (or LABs) 902 that are interconnected by a network of column and row interconnect conductors of varying length and speed. LABs 902 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 900 also includes a distributed memory structure including random access memory (RAM) blocks of varying sizes provided throughout the array. The RAM blocks include, for example, blocks 904, blocks 906, and block 908. These memory blocks can also include shift registers and first-in-first-out (FIFO) buffers.

FPGA 900 further includes digital signal processing (DSP) blocks 910 that can implement, for example, multipliers with add or subtract features. Input/output elements (IOEs) 912 located, in this example, around the periphery of the chip, support numerous single-ended and differential input/output standards. IOEs 912 include input and output buffers that are coupled to pads of the integrated circuit. The pads are external terminals of the FPGA die that can be used to route, for example, input signals, output signals, and supply voltages between the FPGA and one or more external devices. FPGA 900 also includes transceiver circuit 300. It is to be understood that FPGA 900 is described herein for illustrative purposes only and that the present invention can be implemented in many different types of integrated circuits.

Figure 10:
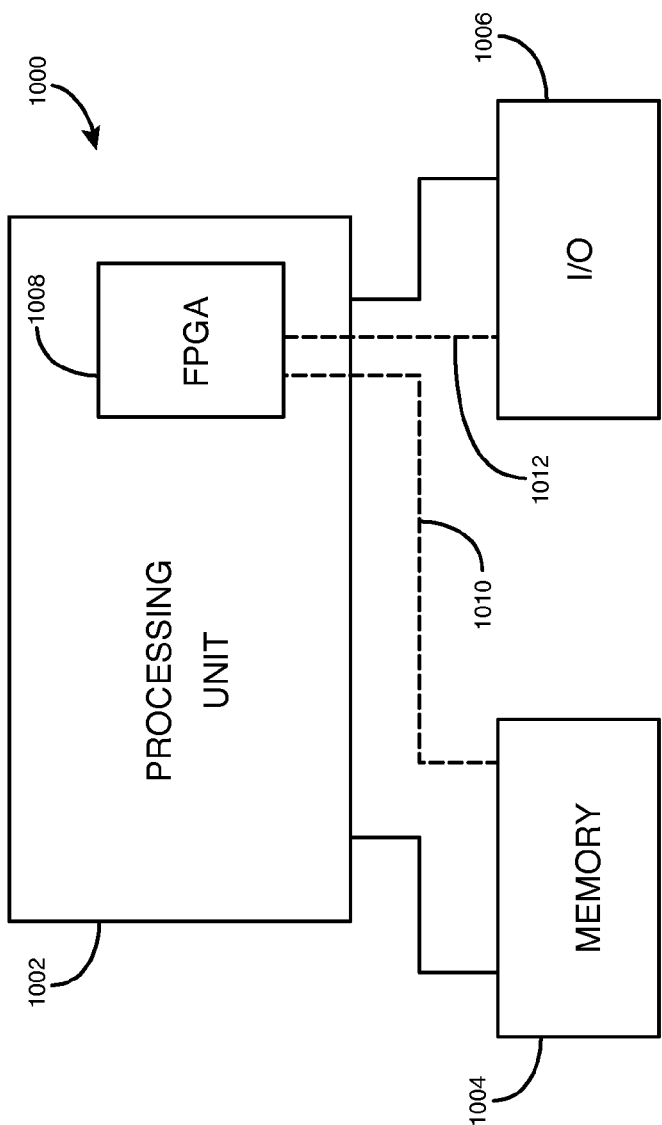
FIG. 10 shows a block diagram of an exemplary digital system that can embody techniques of the present invention.

The present invention can also be implemented in a system that has an FPGA as one of several components. FIG. 10 shows a block diagram of an exemplary digital system 1000 that can embody techniques of the present invention. System 1000 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1000 can be provided on a single board, on multiple boards, or within multiple enclosures.

System 1000 includes a processing unit 1002, a memory unit 1004, and an input/output (I/O) unit 1006 interconnected together by one or more buses. According to this exemplary embodiment, an FPGA 1008 is embedded in processing unit 1002. FPGA 1008 can serve many different purposes within the system of FIG. 10. FPGA 1008 can, for example, be a logical building block of processing unit 1002, supporting its internal and external operations. FPGA 1008 is programmed to implement the logical functions necessary to carry on its particular role in system operation. FPGA 1008 can be specially coupled to memory 1004 through connection 1010 and to I/O unit 1006 through connection 1012.

Processing unit 1002 can direct data to an appropriate system component for processing or storage, execute a program stored in memory 1004, receive and transmit data via I/O unit 1006, or other similar functions. Processing unit 1002 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1008 can control the logical operations of the system. As another example, FPGA 1008 acts as a reconfigurable processor that can be reprogrammed as needed to handle a particular computing task. Alternatively, FPGA 1008 can itself include an embedded microprocessor. Memory unit 1004 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising:
   a receiver circuit operable to generate a first periodic signal, a sampled data signal based on an input data signal, and a data valid signal based on a predefined number of bits in the sampled data signal;
   a data valid monitor circuit operable to generate a count value by counting periods of the first periodic signal, wherein the data valid monitor circuit is operable to generate a phase error signal based on the data valid signal and the count value;
   a clock signal generation circuit operable to generate a second periodic signal; and
   a phase shift circuit operable to generate a third periodic signal based on the second periodic signal and to adjust a phase of the third periodic signal based on the phase error signal.

2. The circuit of claim 1, wherein the data valid monitor circuit is operable to store the count value based on the data valid signal.

3. The circuit of claim 2, wherein the data valid monitor circuit is operable to assert the phase error signal based on a change in the stored count value.

4. The circuit of claim 1 further comprising:
   a phase logic circuit operable to generate a phase shift signal and a phase direction signal based on the phase error signal, wherein the phase shift circuit is operable to adjust the phase of the third periodic signal by a phase shift indicated by the phase shift signal in a direction indicated by the phase direction signal.

5. The circuit of claim 1, wherein the data valid monitor circuit comprises a counter circuit operable to generate the count value by counting a number of the periods of the first periodic signal up to a maximum count value.

6. The circuit of claim 1, wherein the data valid monitor circuit comprises an even/odd detector circuit operable to vary a detection signal in response to the data valid signal, wherein the data valid monitor circuit is operable to store the count value based on the detection signal, and wherein the data valid monitor circuit is operable to assert the phase error signal based on a change in the stored count value.

7. The circuit of claim 1 further comprising:
   a buffer circuit operable to store data bits of the sampled data signal.

8. The circuit of claim 7 further comprising:
   a transmitter circuit operable to generate an output data signal based on the data bits stored in the buffer circuit in response to the third periodic signal.

9. The circuit of claim 1, wherein the circuit is a transceiver, and the transceiver is in a field programmable gate array integrated circuit.

10. A circuit comprising:
    a receiver circuit operable to generate a first periodic signal, a sampled data signal based on an input data signal, and a data valid signal based on a predefined number of bits in the sampled data signal;
    a data valid monitor circuit operable to generate a count value based on the first periodic signal, wherein the data valid monitor circuit is operable to store the count value based on the data valid signal, and wherein the data valid monitor circuit is operable to generate a first phase error signal based on a change in the stored count value;
    a clock signal generation circuit operable to generate a second periodic signal; and a phase shift circuit operable to generate a third periodic signal based on the second periodic signal and to adjust a phase of the third periodic signal based on the first phase error signal.

11. The circuit of claim 10, wherein the data valid monitor circuit is operable to assert high the first phase error signal based on an increase in the stored count value, and wherein the data valid monitor circuit is operable to assert high a second phase error signal based on a decrease in the stored count value.

12. The circuit of claim 11, wherein the phase shift circuit is operable to shift the phase of the third periodic signal based on the first and the second phase error signals.

13. The circuit of claim 11 further comprising:
a phase logic circuit operable to generate a phase shift signal and a phase direction signal based on the first and the second phase error signals, wherein the phase shift circuit is operable to shift the phase of the third periodic signal by a phase shift indicated by the phase shift signal in a direction indicated by the phase direction signal.

14. The circuit of claim 10, wherein the clock signal generation circuit is a phase-locked loop circuit.

15. The circuit of claim 10, wherein the data valid monitor circuit comprises a detector circuit operable to vary an even/odd detection signal in response to each period in the data valid signal, and wherein the data valid monitor circuit is operable to store the count value based on the even/odd detection signal.

16. The circuit of claim 10 further comprising:
a phase logic circuit operable to generate a series of pulses in a phase shift signal based on a pulse in the first phase error signal, wherein the phase shift circuit is operable to adjust the phase of the third periodic signal by a phase shift in response to each pulse in the series of pulses in the phase shift signal.

17. The circuit of claim 10 further comprising:
a buffer circuit operable to store data bits in the sampled data signal in response to the first periodic signal, wherein the buffer circuit is operable to generate a buffered data signal based on the stored data bits; and a transmitter circuit operable to transmit an output data signal based on the buffered data signal in response to the third periodic signal.

18. A method comprising:
generating a first periodic signal in a receiver;
generating a sampled data signal in the receiver based on an input data signal;
generating a data valid signal based on a predefined number of bits in the sampled data signal;
generating a count value by counting periods of the first periodic signal;
generating a first phase error signal based on the data valid signal and the count value;
generating a second periodic signal;
generating a third periodic signal based on the second periodic signal; and
adjusting a phase of the third periodic signal based on the first phase error signal.

19. The method of claim 18, wherein generating a first phase error signal based on the data valid signal and the count value comprises storing the count value based on the data valid signal.

20. The method of claim 19, wherein generating a first phase error signal based on the data valid signal and the count value further comprises asserting the first phase error signal based on an increase in the stored count value, and asserting a second phase error signal based on a decrease in the stored count value, and
wherein adjusting a phase of the third periodic signal based on the first phase error signal comprises adjusting the phase of the third periodic signal based on the first and the second phase error signals.

21. The method of claim 18 further comprising:
generating a series of pulses in a phase shift signal based on a pulse in the first phase error signal, wherein adjusting a phase of the third periodic signal based on the first phase error signal comprises adjusting the phase of the third periodic signal by a phase shift in response to each pulse in the series of pulses in the phase shift signal.

* * * * *